United States Patent [19]

Strother

[11] 4,388,646
[45] Jun. 14, 1983

[54] LOW-DISTORTION DETECTION OF PULSES SUPERIMPOSED ON AN UNKNOWN AND VARIABLE BACKGROUND SIGNAL

[75] Inventor: John A. Strother, Princeton, N.J.

[73] Assignee: RCA Corporation, New York, N.Y.

[21] Appl. No.: 271,035

[22] Filed: Jun. 4, 1981

[51] Int. Cl.³ .............................................. H04N 5/21
[52] U.S. Cl. ................. 358/160; 250/203 R; 307/231; 307/518; 328/114; 358/166; 358/125; 358/213; 364/455; 364/517; 375/76
[58] Field of Search .................. 358/36, 37, 160, 166, 358/167, 213, 163, 103, 125; 250/203 R; 375/58, 76, 94; 307/231, 517, 518, 520, 356, 542, 464, 221 D; 357/24; 364/455, 515–517; 328/114, 151

[56] References Cited

U.S. PATENT DOCUMENTS

| | | | |
|---|---|---|---|
| 3,120,578 | 2/1964 | Potter et al. | 358/125 X |
| 3,444,380 | 5/1969 | Webb | 358/125 X |
| 4,160,272 | 7/1979 | Thomas et al. | 358/125 |
| 4,268,863 | 5/1981 | Los | 358/125 X |
| 4,334,244 | 6/1982 | Chan et al. | 358/166 |

Primary Examiner—Robert L. Richardson
Attorney, Agent, or Firm—Joseph S. Tripoli; George J. Seligsohn

[57] ABSTRACT

Significant features of interest of each pulse shape, amplitude and time of occurrence characteristics, are preserved in a detection circuit that (1) employs a tapped delay line as part of means for deriving a pedestal signal at the predicted current level of an input signal to the delay line, the level of the pedestal signal being determined by extrapolating the slope and level of a running segment of the past history of the input signal level to the delay line, (2) subtracts the derived pedestal signal level from the actual level of an applied input signal, comprised of pulses superimposed on an unknown and variable background signal, to produce a difference level, (3) indicates the occurrence of a pulse by this difference level being at least equal to a threshold level, (4) selectively applies the applied input signal as the input signal to the delay line when the difference level is below the threshold level, and (5) selectively applies the pedestal signal as an input signal to the delay line when the difference level is at least equal to the threshold level.

8 Claims, 3 Drawing Figures

TIMING DIAGRAM

LOW-DISTORTION DETECTION OF PULSES SUPERIMPOSED ON AN UNKNOWN AND VARIABLE BACKGROUND SIGNAL

This invention relates to an improved circuit for low-distortion detection of pulses superimposed on an unknown and variable background signal. Although not limited thereto, this improved circuit is particularly suitable for use as a star-signal detector in an attitude and/or position control system aboard a satellite.

Conventional circuits for detecting pulses superimposed on an unknown and variable background signal make use of the fact that the pulses are relatively high-frequency signals, while the background signal is a relatively low-frequency signal. Therefore, a high-pass filter may be used to easily separate the pulses from the background. However, a high-pass filter inherently possesses frequency-dependent variation in amplitude response and time delay characteristics which result in the distortion of the shape and the shifting of the time position of a pulse in passing from the input to the output of a high-pass filter. Further, the time and amplitude distortions produced by such a filter in response to one pulse can gravely alter the response of the system to other signal pulses which follow closely after the first pulse. In those cases, where such distortions in shape, shifts in time position, and alterations of response to subsequent pulses cannot be tolerated, a high-pass filter cannot be used in the detection of a pulse superimposed on an unknown and variable background signal. A star detector aboard a satellite is one example of such a case.

One way of determining the attitude and/or position of a satellite in space involves (1) viewing a certain angular field of space with respect to the orientation of the satellite with a two-dimensional imager situated on the satellite, (2) discriminating between those portions of the imager signal which represent stars and those that do not, (3) identifying the particular stars being imaged by comparing the respective relative spatial positions and relative intensities of the detected star signals within the image with a stored star map of the respective spatial positions and intensities of known stars, and (4) computing the orientation of the satellite in space in accordance with the relative position of the pattern of identified stars within the two-dimensional image field of the imager. Such computed information may be used in the control of active devices, such as momentum wheels or thrusters, to properly reorient the satellite. In conjunction with an earth sensor and a clock, such computed celestial attitude information can also be used to determine the satellite's position with respect to the earth, and by use of thrusters to correct or alter such position, if necessary. Such control is needed in station keeping of a satellite in a geosynchronous orbit, by way of example. Depending on the attitude-control requirements of the satellite and the characteristics of the particular star sensor, it is also possible in some cases to determine the short-term attitude rates of the satellite using one or more star sensors and without reference to stored information about the identities of the stars. In these cases, the attitude control system can dispense with mechanical sensors such as gyroscopes. Thus, a benefit of a star-mapping control system is that, unlike an inertial guidance control system, it does not employ mechanical devices such as gyroscopes, which are subject to a relatively high probability of failure over the life expectancy of a satellite.

From the above brief description of a star-mapping control system for a satellite, it is apparent that it is essential (1) that high-magnitude (low luminosity) stars be detectable despite variable and unknown background light conditions and variable and unknown background noise conditions of the imager, and (2) that the processing of the signals from the imager preserve the relative level, and the shape and relative position of each pulse signal, which are indicative, respectively, of the relative magnitude and spatial location of each of the imaged stars. Such signal processing may be accomplished by a circuit incorporating the present invention.

Briefly, the present invention is directed to pulse detection apparatus responsive to an applied analog time signal (i.e., a signal having an amplitude that varies as a function of time) comprising an unknown and variable level component having a relatively low-frequency variation, on which is superimposed one or more relatively high-frequency pulse components, in which the significant features of interest of each pulse are its shape, amplitude, and time of occurrence characteristics. The apparatus comprises first means including storage means responsive to a running segment of given duration of the immediate past history of the level of an input signal to the first means for deriving a pedestal signal at a predicted present level of the input signal to the first means. The predicted present level of the input signal to the first means is a function of the D.C. level and the slope of the aforesaid running segment. Switch means is operative in a first switch position thereof for applying the analog time signal as the input signal to the first means and is operative in a second switch position thereof for applying the predicted pedestal signal level as the input signal to the first means. Second means subtract the predicted pedestal signal from the actual present level of the analog time signal to derive a difference signal. Third means, which is responsive to the level of the difference signal with respect to a given threshold level, derives a status signal indicative of whether or not the level of the difference signal is equal to or exceeds the given threshold level. Fourth means coupled between the third means and the switch means maintains the switch means in its second switch position whenever the level of the difference signal is equal to or exceeds the threshold level and maintains the switch means in its first switch position whenever the level of the difference signal is below this threshold level. Output means, which are responsive to the difference signal and to the status signal, derive one or more outputs from the pulse detection apparatus which are indicative of at least one of the aforesaid characteristics of each pulse.

Figure 1:
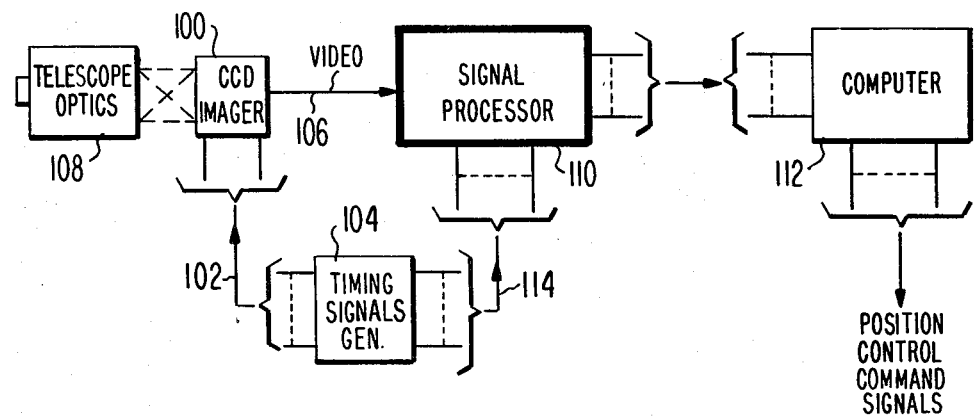
FIG. 1 is a block diagram of a star-mapper control system for a satellite that employs a signal processor which incorporates the present invention.

The star-mapper control system for a satellite shown in FIG. 1, comprises charge-coupled device (CCD) imager 100, which has a known orientation with respect to the satellite. As is known in the art, a CCD imager comprises a solid-state chip on which is situated a two-dimensional array of relatively-small discrete, substantially contiguous picture elements (hereafter referred to as pixels) for converting a light pattern imaged onto the array into a corresponding charge pattern. The CCD array (together with other CCD registers which may be on the chip), in response to appropriate clock voltages applied as a control input to CCD imager 100 from timing signals generator 104, converts the two-dimensional image charge pattern on the array into a television-type, raster-scan video output signal 106 from CCD imager 100.

In the star-mapper control system shown in FIG. 1, telescope optics 108 projects a certain angular two-dimensional field of view of space to the two-dimensional array of CCD imager 100. The field of view will normally include a pattern of star signals, in which the particular pattern imaged on CCD imager 100 is determined by the attitude of the satellite with respect to celestial space, at that time. The relative light intensity of any individual imaged star within the imaged pattern of stars depends on the magnitude of that star (as known in astronomy, stars with high magnitudes are relatively dim and stars with low magnitudes are relatively bright). Further, the location of any individual star, relative to the respective locations of other stars within the pattern, is substantially fixed. However, the location of any individual star within the image field of CCD imager 100 depends upon the exact attitudinal position of the satellite (and, hence, of CCD imager 100 at that time) in celestial space. Since the respective positions and magnitudes of stars in celestial space are well known, such information may be stored in the memory of the computer and compared with the relative magnitudes and positions of detected stars within the field of view of celestial space then being imaged by CCD imager 100 to thereby determine the then-existing attitudinal position of the satellite in celestial space. Furthermore, when the initial attitude of the satellite is known, any change in attitude can be computed from the image field of the CCD imager in accordance with the rate and direction of change in location of an imaged star within the image field. All such information can then be used by the computer to control the active devices for changing the attitude of the satellite (or, in some cases, satellite translational motion).

Each light beam, representing an individual star, imaged by CCD imager 100 forms an image spot defined by its parameters of beam-width, shape (such as Gaussian), amplitude and spatial location within the image field. As known, the size of each image spot varies inversely with the resolving power of the telescope optics. Preferably, the resolving power of the telescope optics is made sufficiently low to cause the size of the each star-representing image spot to be big enough to cover a plurality of successive pixels of the imager in both the vertical and horizontal directions. This permits the computer to more accurately locate a star by computing the "center-of-gravity" of each spot from the relative signal intensity and the location within the image field of each of the pixels forming that spot. In addition, it permits the computer to employ the spot shape (e.g., Gaussian distribution formed by contiguous pixel signals that represent a star) to discriminate between valid star signals and generally similar spurious signals caused by noise, such as noise due to defects in the CCD imager.

The image field also comprises an unknown and variable level background, which has relatively low-frequency spatial components compared to the relatively high spatial frequency components of star-manifesting image spots. This low-frequency background is due to such factors as the amount of background light in the image field and to dark current and low-frequency noise produced by the CCD imager itself. It is necessary to separate the star-representing image spots, which are superimposed on the unknown and variable level background, from the background, without substantially affecting the parameters of shape, amplitude and location of each star-representing image spot. This is accomplished by signal processor 110, which processes the video output signal 106 from CCD imager 100 to derive appropriate output signals from signal processor 110 (which are applied as inputs to computer 112) that are indicative of the aforesaid parameters of shape, amplitude and location of each star-representing image spot in the image field of CCD imager 100.

The signal output 106 is formed by successive scan lines of the image field in a first direction, with the successive scan lines being displaced from each other in a second direction orthogonal to the first direction (similar to that a television frame). Therefore, video output signal 106 constitutes an analog time signal comprised of an unknown variable level, relatively low-frequency background on which is superimposed one or more relatively high-frequency pulses (the width of each star-representing image spot within any particular scan line). Each pulse is defined by its parameters, of shape, amplitude and time of occurrence. Furthermore, video output signal 106, during each scan line, is made up of a stream of successive pixels, the duration of each pixel being determined by the output clock frequency of CCD imager 100. Signal processor 110, in addition to receiving video output signal 106 as a signal input thereto, also receives clock signals 114 from timing signals generator 104 as a control input thereto. The clock signals applied to signal processor 110, which are discussed in more detail below, occur at a repetition rate equal to that of the successive pixels forming video output signal 106.

Signal processor 110, which incorporates the present invention, comprises pulse detection apparatus which produces outputs indicative of the parameters of shape, amplitude and time of occurrence of pulses corresponding to star-representing image spots of the image field. The outputs from signal processor 110 are applied as inputs to computer 112, which utilizes this information together with stored information to produce position control command signals as outputs therefrom for the active devices (thrusters, momentum wheels, etc.) used to alter the attitude and/or position of the satellite.

Figure 2:
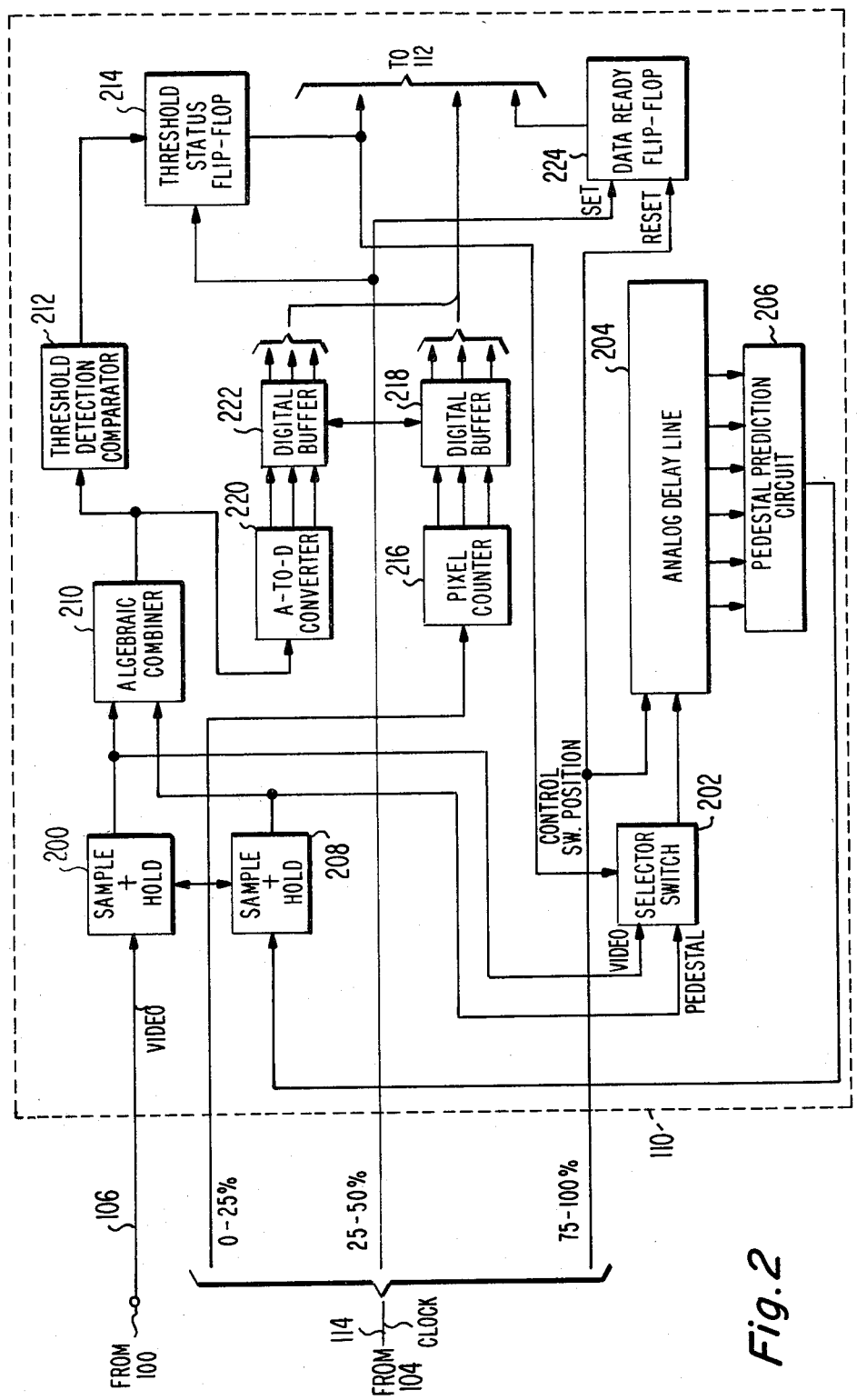
FIG. 2 is a block diagram of a preferred embodiment of a signal processor incorporating the present invention.

A preferred embodiment of signal processor 110 is shown in FIG. 2. The digital clock timing signals 114 from timing signals generator 104 which control this preferred embodiment are comprised of three sets of non-overlapping, phase-displaced sets of clock pulses, the pulses of each set occurring at the pixel frequency. More specifically, as shown by way of example in the timing diagrams of FIG. 3, the clock pulse of the first set, shown in timing diagram 302, occurs during the first quarter of each video signal pixel period, shown in timing diagram 300. Similarly, as shown in timing diagram 304, each clock pulse of the second set occurs during the second quarter of each video signal pixel period and, as shown in timing diagram 306, each clock pulse of the third set occurs during the fourth quarter of each video signal pixel period.

Video signal 106 from CCD imager 100 is sampled by first sample and hold circuit 200 in response to each clock pulse of the first set. In order to insure that the sampling of the video signal does not produce aliasing, the CCD imager 100 includes low-pass filter means for removing substantially all video signal frequency components higher than the pixel sampling frequency. The output from first sample and hold circuit 200 is applied through selector switch 202, in a first switch position thereof, as a signal input to clocked, tapped analog delay line 204. Tapped analog delay line 204 samples the level of the signal then present at its input during the occurrence of each pulse of the third set. Delay line 204, which includes a plurality of spaced taps along the length thereof, provides a known given fixed time delay between the input to delay line 204 and the first of these taps and provides successive known additional time delays between each pair of adjacent taps of delay line 204. These taps are coupled as inputs to pedestal prediction circuit 206. Pedestal prediction circuit 206 comprises an algebraic combiner made up of a network of resistors together with one or more operational amplifiers, which are utilized to provide a predicted level of the input signal to delay line 204 as a function of the respective values concurrently present at the plurality of taps of delay line 204. The values of the resistors and the connections from the taps to the operational amplifiers are governed by which of the past signal values are included in determining the average level, which are used in determining the apparent slope, and how far one must project from the location to which the average value is attributed to the location of the next pixel. All of these parameters are open to selection in accordance with the background fluctuation characteristics of the imager and the prediction-duration requirements associated with the expected star pulses. One specific example of such a prediction circuit, which utilizes an eight-pixel delay line, generates the predicted level of the signal input to the delay line by computing the equally-weighted average level of the most recent four pixels, computing the slope between this average level and the average level of the earlier four pixels occupying the other half of the delay line, and projecting this slope through the effective locations of the two averages to the location of the next pixel scheduled to occur at the signal input to the delay line. Denoting the most recent level as $y_8$ and decreasing subscripts down to $y_1$ for the oldest pixel level that is still in the delay line, and designating the predicted level at the input to the delay line as $y_p$, the formula which expresses this prediction algorithm in its simplest form is:

$$y_p = 13/32(y_8+y_7+y_6+y_5) - (5/32)(y_4+y_3+y_2+y_1)$$

In any event, pedestal prediction circuit 206 derives an output pedestal at a level equal to the predicted level of the next-occurring signal input to delay line 204.

The predicted pedestal level at the output of circuit 206 is sampled by second sample and hold circuit 208 in response to each clock pulse of the first set. The respective outputs of first and second sample and hold circuits 200 and 208 are applied as inputs to algebraic combiner 210, having unity gain, which operates as a subtractor for subtracting the then-existing predicted pedestal level at the output of second sample and hold circuit 208 from the then-existing actual level of the video signal at the output of first sample and hold circuit 200, thereby providing a difference signal at the output of combiner 210. Threshold detection comparator 210 compares the level of the difference signal at the output of combiner 210 with a threshold level. The output from threshold detection comparator 212 is applied as a signal input to threshold status flip-flop 214. In response to each clock pulse of the second set, threshold status flip-flop 214 is set when the signal input thereto from comparator 212 indicates that the level of the difference signal is equal to or exceeds the threshold level and is reset when the input hereto from comparator 212 indicates that the level of the difference signal is below the threshold level. The output from threshold status flip-flop 214 is applied as a switch position control signal to selector switch 202 for maintaining selector switch 202 in its first switch position when flip-flop 214 is reset and for maintaining selector switch 202 in its second switch position when flip-flop 214 is set. In its second switch position, selector switch 202 forwards the pedestal level of the output of second sample and hold circuit 208 as the signal input to tapped analog delay line 204.

Pixel counter 216 counts successive clock pulses of the first set 302 (FIG. 3) applied as an input thereto to provide a digital output of the pixel count during a scan line of imager 100. The pixel count of the output of counter 216 is indicative of the location of a pixel in the image field. During each clock pulse of the second set, the output from pixel counter 216 is loaded into first digital buffer 218.

Figure 3:
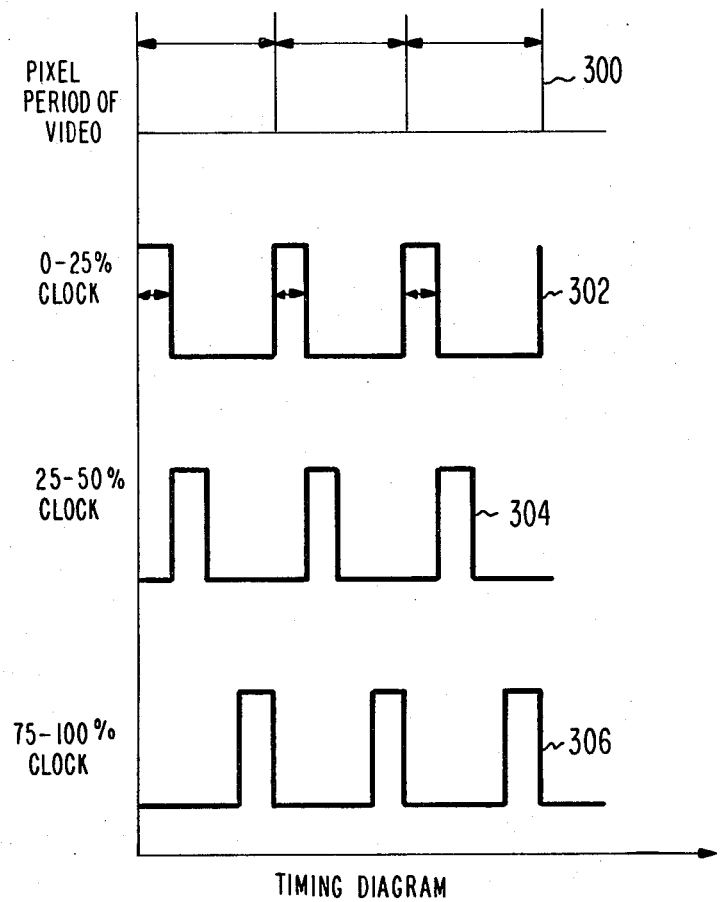
FIG. 3 illustrates various timing diagrams useful in describing the operation of the signal processor shown in FIG. 2.

The level of the difference signal in analog form at the output of algebraic combiner 210 is translated to digital form by analog-to-digital converter 220. Second digital buffer 222 is loaded during each clock pulse of the second set 304 (FIG. 3) with the digital output from analog-to-digital converter 220. Data-ready flip-flop 224 is set in response to each clock pulse of the second set and is reset in response to each clock pulse of the third set 206 (FIG. 3).

The respective outputs from threshold status flip-flop 214, first and second digital buffers 218 and 222 and data-ready flip-flop 224 constitute the output from data processor 110 that are applied as inputs to computer 112.

From the foregoing discussion, it will be seen that analog delay line 204 stores a running segment of given duration, which defines the immediate past history of the signal input thereto, and pedestal prediction circuit 206 extrapolates the predicted value of the current level of the signal input to delay line 204 as a function of both the value and slope of this past history. When video signal 106 is composed solely of a low-frequency background (which is most of the time), the difference between the actual level and the predicted level of the video signal will remain small, and, therefore, be below the threshold level. Thus, threshold status flip-flop 214 will remain in a reset condition and maintain selector switch 202 in its first switch position. This results in successive pixels of the actual video signal, at the output of first sample and hold circuit 200, being applied as the signal input to delay line 204. Should the low-frequency background level slowly vary, the pedestal level from circuit 206 would tend to follow it, thereby maintaining flip-flop 214 in its reset condition and selector switch in its first switch position. However, in response to the occurrence of the first of the successive pixels of a star-representing pulse, threshold level flip-flop 214 is set and selector switch 202 is switched to its second switch position. In its second switch position, the pedestal level, rather than the actual video level, is applied as the signal input to delay line 204. Therefore, the pedestal level (which is meant to represent only the predicted level of the background) is not affected by the occurrence of a star-representing pulse superimposed on a variable-level background of video signal 106. However, it should be understood that the predicted level of the pedestal does not remain constant during the successive pixels of a star-representing pulse. This is true because the pedestal prediction circuit employs both the average level and the slope to predict the current level of the pedestal. Therefore, continual extrapolation of the slope through successively-occurring pixels causes the pedestal level to rise when the sign of the immediate past history slope is positive and to fall when the sign of the immediate past history slope is negative. Thus, the level of the difference signal during each pixel of a star-representing pulse remains substantially independent of the varying level of the background. For this reason, the level of the difference signal during each pixel is indicative, with high accuracy, to the actual amplitude of only the star-representing pulse itself during that pixel.

Computer 112 may utilize one or more of the outputs applied thereto from signal processor 110 in many ways and for many purposes. First, it may record the respective values stored in digital buffers 218 and 222 during each and every pixel during the interval in which data-ready flip-flop 224 is in its set condition. Second, it may determine that a valid star-representing pulse has been detected if, and only if, threshold status flip-flop 214 remains in its set condition for at least two successive pixels. Third, it may employ the respective difference value levels stored in digital buffer 222 and the pixel count values stored in digital buffer 218 during successive pixels of a valid star-representing pulse to determine the pulse "center-of-gravity" to accurately determine the location of the corresponding imaged star within the image field, and further to compute the brightness of the imaged star corresponding to that pulse.

While the preferred embodiment of the present invention disclosed herein utilizes a CCD imager, it should be understood that the principles of the present invention may be utilized with a video signal derived from a continuous imager, such as a vidicon. Further, the principles of the present invention may be utilized in any type of pulse detection apparatus responsive to an applied analog time signal comprised of an unknown and variable level having relatively low-frequency background fluctuations on which is superimposed one or more relatively-high frequency pulses, in which the significant features of interest of each pulse are its shape, amplitude and time of occurrence characteristics, regardless of how the analog time signal is originally generated.

What is claimed is:

1. Pulse detection apparatus responsive to an applied analog time signal comprising an unknown and variable level, relatively low-frequency background components on which is superimposed one or more relatively high-frequency pulse components, in which the significant features of interest of each pulse are characterized by its shape, amplitude and time of occurrence characteristics; said apparatus comprising:
   first means including storage means responsive to a running segment of given duration of the immediate past history of the level of an input signal to said first means for deriving a pedestal signal at a predicted present level of said input signal to said first means said predicted present level of the input signal to the first means being a function of the D.C. level and the slope of said running segment,
   switch means operative in a first switch position thereof for applying said analog time signal as said input signal to said first means and operative in a second switch position thereof for applying said pedestal signal as said input signal to said first means,
   second means for subtracting said pedestal signal from the actual present level of said analog time signal to derive a difference signal,
   third means responsive to the level of said difference signal with respect to a given threshold level for deriving a status signal indicative of whether or not the level of said difference signal is equal to or exceeds said given threshold level,
   fourth means coupled between said third means and said switch means for maintaining said switch means in its second switch position whenever the level of said difference signal is equal to or exceeds said threshold level and for maintaining said switch means in its first switch position whenever the level of said difference signal is below said threshold level, and
   output means responsive to said difference signal and said status signal for deriving one or more outputs from the pulse detection apparatus which are indicative of at least one of said characteristics of each pulse.

2. The pulse detection apparatus defined in claim 1, wherein said analog time signal is comprised of a stream of successive pixels of a scanned image field in which each individual pixel corresponds to a different particular location within the image field, each pulse having a duration equal to a plurality of successive pixels;
   wherein said output means includes fifth means for deriving a first output signal having a value during each one of said plurality of successive pixels which is indicative of the value of said difference signal during that pixel and sixth means for deriving a second output signal having a value during each one of said successive pixels which is indicative of the particular location corresponding to that pixel.

3. The pulse detection apparatus defined in claim 2, wherein said fifth means includes an analog-to-digital converter for translating the level of said difference signal during each pixel into a digital first output signal, and
   wherein said sixth means includes a pixel counter for deriving a digital second output signal.

4. The pulse detection apparatus defined in claim 1, wherein said first means includes a tapped analog delay line having an input corresponding to the input of said first means and a plurality of spaced taps to provide a given first time delay between said input and a first of said taps and a given second time delay corresponding to said given duration of said running segment between the first and last of said plurality of taps, and a pedestal prediction circuit having the respective levels concurrently at said plurality of taps applied as inputs thereto for predicting the level of said input signal then at said input to said delay line as a function of said respective concurrent levels at said plurality of taps and the value of said given first time delay.

5. In the combination of a CCD imager comprising a predetermined number of discrete pixels for imaging a field comprising one or more separate light beams each having a beam width equal to a plurality of pixels, each separate light beam being defined by parameters which include its relative intensity and its relative location within said image field, timing means for applying a clock voltage to said CCD imager for serially reading out at a given frequency successive pixels of said image field in a predetermined order thereby to derive an analog time signal corresponding to said image field, and pulse detection apparatus responsive to said analog time signal for detecting the shape, amplitude and time of occurrence characteristics of respective pulses corresponding to each of said separate light beams; the improvement wherein:

said timing means generates clock signals at said given frequency, and said pulse detection apparatus comprises a first sample and hold circuit controlled by clock signals for sampling each successive pixel of said time signal, pixel counting means controlled by clock signals for identifying the relative location in said field of each pixel, a clock-controlled analog tapped delay line having an input and a plurality of spaced taps, switch means for applying the output of said first sample and hold circuit as said input to said delay line in a first switch position of said switch means, a pedestal prediction circuit having the respective signal levels concurrently at said plurality of taps applied as input signals thereto for producing a pedestal signal at a predicted value of the signal level then at said input to said delay line as a function of said respective concurrent levels at said plurality of taps and the fixed value of the time delay between said input to said delay line and a certain one of said plurality of taps, a second sample and hold circuit controlled by said clock signals for sampling said pedestal signal during each successive pixel and for applying the output of said second sample and hold circuit through said switch means to said input of said delay line in a second switch position of said switch means, means for subtracting the output from said second sample and hold circuit from the output from said first sample and hold circuit to derive a difference signal, means including a threshold detection comparator and a clock-controlled threshold status flip-flop coupled to said switch means for maintaining said switch means in its second switch position during those pixels in which the level of said difference signal is equal to or exceeds a given threshold level and maintaining said switch means in its first switch position during those pixels in which the level of said difference signal is below said given threshold level, and output means responsive to the state of said threshold level, and output means responsive to the state of said threshold status flip-flop, the count of said pixel counting means and the level of said difference signal for deriving one or more output signals from said pulse detection apparatus.

6. The combination defined in claim 5,
wherein said pixel counting means comprises a digital counter for serially counting clock signals at said given frequency, and
wherein said output means comprises a first digital buffer for storing the digital pixel count, an analog-to-digital converter for translating the level of said difference signal to digital form, a second digital buffer for storing the level of said difference signal in digital form, and clock-controlled means for controlling said first and second digital buffers and said threshold status flip-flop to effect the derivation of said output signals from said pulse detection apparatus.

7. The combination defined in claim 6,
wherein said timing means generates as said clock signals first, second and third sets of non-overlapping phase-displaced clock pulses at said given frequency, each clock pulses of said first set occurring toward the beginning of each pixel, each clock pulse of said third set occurring toward the end of each pixel and each clock pulse of said second set occurring during each pixel intermediate the occurrences of clock pulses of said first and third sets,
wherein said output means includes a data-ready flip-flop for producing an output signal of said pulse detection apparatus when said data-reader flip-flop is in a set state, and
wherein said first set of clock pulses are applied as sample-control clock signals to said first and second sample and hold circuits to effect sampling and to said pixel counter to effect counting, wherein said second set of clock pulses are applied as clock signals to said threshold status flip-flop to effect setting thereof during each pixel in which the level of said difference signal is equal to or exceeds said threshold level and to effect resetting thereof during each pixel in which the level of said difference signal is below said threshold level, to said first and second digital buffers to enable loading thereof and to said data ready flip-flop to effect setting thereof, and wherein said third set of clock pulses are applied as clock signals to said switch and said tapped delay line to effect loading of said tapped delay line and to said data-ready flip-flop to effect resetting thereof.

8. The combination defined in claim 7,
wherein clock pulses of said first set occur during approximately the first quarter of each pixel, clock pulses of said second set occur during approximately the second quarter of each pixel and clock pulses of said third set occur during approximately the fourth quarter of each pixel.

* * * * *